Dec. 22, 1953     D. C. McDONALD ET AL     2,663,832

MULTIPLE MODE CLOSED-CYCLE CONTROL SYSTEM

Filed Oct. 1, 1952     4 Sheets-Sheet 1

INVENTORS.
Donald C. McDonald
Kenneth C. Mathews
and Robert C. Boe.
By Thiess, Olsen + Mecklenburger Attys INVENTORS.
Donald C. McDonald
and Kenneth C. Mathews
Robert C. Boe.

Dec. 22, 1953    D. C. McDONALD ET AL    2,663,832
MULTIPLE MODE CLOSED-CYCLE CONTROL SYSTEM
Filed Oct. 1, 1952    4 Sheets-Sheet 4

INVENTORS.
Donald C. McDonald
and Kenneth C. Mathews
Robert C. Boe.
By: Thiess, Olsen & Mecklenburger, Attys.

UNITED STATES PATENT OFFICE 2,663,832

MULTIPLE MODE CLOSED-CYCLE CONTROL SYSTEM

Donald C. McDonald, Skokie, Kenneth C. Mathews, Evanston, and Robert C. Boe, Des Plaines, Ill., assignors to Cook Electric Company, Chicago, Ill., a corporation of Illinois Application October 1, 1952, Serial No. 312,482

14 Claims. (Cl. 318—28)

This invention relates to improvements in closed-cycle control systems, and, more particularly, to closed-cycle control systems wherein positional agreement is desired between a controllable input element and an output element whose position is to be controlled correspondingly.

It is the principal object of this invention to provide improved methods and apparatus for operating such closed-cycle control systems.

It is a further object of this invention to provide improved apparatus for such closed-cycle control systems wherein optimum positional agreement will be maintained at all times for devices having limited power or velocity characteristics.

It is often desired to control the position of a mass having large inertia without actually having the control apparatus supply the energy necessary to move the mass and overcome said inertia. An excellent example of this type of operation is in a gun director or the like wherein an operator or automatic tracking device follows a target in a determinable pattern and it is desired that a gun and mount of great mass will automatically follow the same pattern. It is obvious that manpower or a delicate automatic tracking device cannot supply the energy necessary to move such a mass with speed and accuracy. They can, however, generate a signal characteristic of such pattern which can control an extrinsic power source to drive such a mass.

Many attempts have been made to create a device which will adequately accomplish a fulfillment of this broad aim but all have failed to provide a totally satisfactory solution. All closed-cycle controllers presently known can be classed in one of two general categories. The first class utilizes an on-off or contactor mode of operation wherein a device compares the relative positions of a controlling element and a controlled element, and when there is a positional difference of a predetermined magnitude between these elements a switch is closed which will apply the maximum force of a motive means to the controlled element to bring said element into substantial positional agreement with the controlling element. This type of system has the obvious disadvantage of erratic, inaccurate motion, as a certain predetermined error is necessary before the motive power is applied, and when the power is applied the maximum power of the device is always used. It has the advantage of very rapid response and minimum time of reducing an error to zero, but it has the accompanying disadvantage of applying the maximum force of the energy source with resultant oscillations and overshoot of the zero position.

The second general class into which the prior known devices fall is a class of devices having continuous control of an output. In these devices a force is applied as a linear function of the relative position, velocity, or other variable of the controlled element with respect to the controlling element. These devices can be designed to position the controlled element relatively accurately with respect to the controlling element when the relationships of said elements are relatively constant over a long period of time. Such linear devices having the controlling element in steady state operation can be designed to have a zero positional difference between the controlling and controlled elements, but such a linear device is characterized by poor response to rapid changes in the relationship of the controlling element or input to the controlled element or output. This slow response is a result of two factors detrimental to controller speed. The controlling signal is proportional to the positional difference or rate-of-change of positional difference of the two elements, and thus small differences produce small signals and consequent small correcting forces. Additionally, while the ideal controller would positively accelerate rapidly to a predetermined point and then rapidly decelerate to both positional and velocity agreement with the controlling element, these linear devices undergo a gradual acceleration, torque reversal, and deceleration with consequent increase of response time and loss of tracking.

Thus, all of the systems heretofore known have evidenced one or more of the following faults: They will either be sluggish in response to rapid changes in position or velocity and be extremely large with large power control apparatus in the case of linear devices, or, they will be inaccurate, tending to oscillate or hunt and overshoot when of the type of device known as contactor controls.

Therefore, it is an additional object of this invention to provide a control device which will operate as a linear control for very small positional differences or rate-of-change of position differences, but will act as a contactor control for larger positional differences or rate-of-change of position differences.

It is an additional object of this invention to reduce the weight, power requirement, and cost of control devices by eliminating the need for linear controls and amplifiers which would be capable of the power necessary to provide the requirement for large positional differences in linear operation.

It is a further object of the invention to accomplish the advantages of increased speed and accuracy by operation in multiple modes wherein the mode of operation is to be determined by a function of the positional difference and the rate-of-change of the positional difference of the device.

Additional objects of the invention will become manifest from the description, accompanying drawings, and appended claims.

In carrying out this invention in one form, a closed-cycle control system is provided which will control the angular position of a rotating shaft in response to the angular position of a controlling shaft. This type of control is generally termed a servo mechanism and shall hereinafter be referred to as a servo. More particularly one form of the invention consists of a motor and a load, a controlling shaft or input source, a means for comparing the position of the load and the input source to generate an error voltage proportional to positional difference, an essentially linear amplifier for such an error voltage, an electronic computer to derive a voltage which is a function of such an error and the rate-of-change of such an error, and a control actuated by the output of the computer to apply the output of such an amplifier to the motor in order to drive the load when the input and load are in substantial positional agreement, and to apply a maximum voltage to the motor in order to drive the load toward positional and velocity agreement with maximum torque when the error and error-rate function increases beyond a predetermined magnitude as determined by the electronic computer and associated control.

For a more complete understanding of this invention, reference should now be made to the drawings, wherein.

Figure 1:
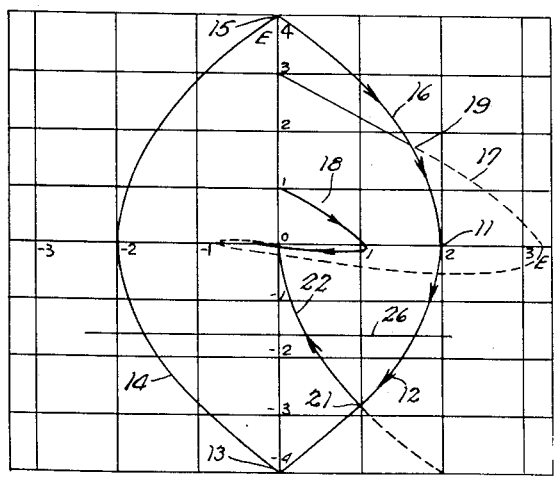
Figure 1 illustrates a phase-plane diagram of a servo employing the teaching of this invention.

Referring now to the drawings, and more particularly to Fig. 1, a phase-plane diagram is illustrated which depicts the general characteristics of a typical servo operating in two modes in accordance with this invention. The abscissa of this diagram represents the error E, or positional difference between an angular input $A_I$, and an output $A_O$. The ordinate of the diagram represents the error rate $\dot{E}$, or the rate-of-change of relative position of the input and output shafts of such a servo. This phase-plane diagram is a valid means of representation of the characteristics of any single-degree-of-freedom control system. In such a diagram, time is eliminated from the usual velocity and position equations and a single plot of velocity and position is used. From this diagram the characteristics of a servo mechanism can be analyzed to clearly illustrate its response time, maximum error, and other characteristics of a given device having some limited maximum torque and a predetermined moment of inertia.

A contactor or off-on servo has the characteristic equation of motion:

(1) $$J\ddot{E} = -T \quad E > 0$$
and
$$J\ddot{E} = -T \quad E < 0$$

where J is the combined moment of inertia of the servo motor and load, $\ddot{E}$ is the acceleration $$\frac{d^2 E}{dt^2}$$

of the error, and T is the full torque of the servomotor.

This equation sets out that for any positive error, negative torque is applied and for negative error, positive torque is applied to the load in an attempt to reduce the error to zero. If a contactor servo is analyzed by this system, it can be seen that if a positive error of any arbitrary magnitude is introduced between the input and output shafts, the motive means will apply a negative torque to the output shaft which will drive the output shaft to eliminate the error. This is illustrated in Fig. 1 as an error, indicated on the curve at 11, which indicates a step function difference of position between an input and output shaft. From the above equation, this applies the torque of a driving means which will tend to negatively accelerate the output with respect to the input, and thus a phase-plane curve of such a device will follow the curve 12 in Fig. 1 in the direction indicated by the arrows. As the load decelerates, that is, $\dot{E}$ becomes more negative, the positive error will be reduced toward positional agreement. The driving means would be thus energized until the curve reaches the point on the ordinate indicated as 13, at which time the error, or value of the abscissa, is zero. However, the additional torque or kinetic energy having been introduced into the device, the output shaft will continue at its new velocity and immediately create a negative error, thus applying positive torque to the load from the motor. The load will be accelerated by the full torque of the motor and will follow curve 14 until the error E is again reduced to zero at 15 at which point negative torque will once again be applied and cause the load to follow curve 16. Thus, the phase-plane curve will follow curves 12, 14 and 16 in a stable oscillatory motion, whereby the device will have positive and negative torques alternately applied to it as the error changes from negative to positive values respectively.

It can be seen that the curves 12, 14 and 16 are substantially parabolic in character as the torques and consequent accelerations $\ddot{E}$ are constant and thus, from the calculus, the error E and error-rate $\dot{E}$ will have a substantially parabolic relationship. It should be further noted that irrespective of the magnitude of the step function that might be used, such a device will always have a phase-plane portrait of this general character and shape. The magnitude of the respective intercepts of the E and $\dot{E}$ axes will be determined by the physical structure, namely, the ratio of the maximum torque of the motor and the inertia of the system.

In a linear servo mechanism, a correcting torque is applied to the output or load as a function of error and error-rate, according to the following general equation derived from the familiar energy of motion equation:

(2) $$J\ddot{E}+l\dot{E}+KE=0$$
$$T_c=l\dot{E}+KE=-J\ddot{E}$$

where $l=$ error rate damping coefficient and $K=$ steady state gain of the servo amplifier. Thus, unless the error or error-rate or a combined function of these factors is equal to or exceeds the maximum for which the device is designed, the maximum torque of the device will never be applied to the load. This necessarily means that correction of input error will not be effected in the minimum possible time as in the full torque operation, but will be corrected over a longer period of time but with a resulting reduction of the oscillatory motion characteristic of a contactor type of servo. This type of linear control is illustrated in Fig. 1 by the curve 17 where a step function of error-rate $\dot{E}$ is introduced into the device. It can be seen that for a given error-rate $\dot{E}$, the torque applied by a linear control will generally be less than that applied by a contactor type of control and will thus result in a phase-plane portrait having a smaller slope at any given point on the curve. The slope of such a phase-plane portrait is proportional to $$\frac{T}{J}$$

the torque to inertia ratio of the particular system under consideration. As a result of this smaller torque in linear controls, and consequent slower acceleration, a larger error $E$ will be introduced into the system before the error-rate $\dot{E}$ is reduced to zero. As the portrait passes below the abscissa, the torque applied to the output, which is a function of error and error-rate, as shown in Equations 2 above, will have a negative component corresponding to the positive error and a compensating positive component corresponding to the negative error-rate. The magnitude of this error-rate damping will be determined by the relative magnitude of the constants $k$ and $l$, and the inertia of the system.

This relationship of $k$ and $l$ will determine the response time of the system and the stability and freedom from hunting of the control. This stable positional agreement is an extremely desirable characteristic where the intended use requires that the input and output be in substantial positional agreement during operation with small changes of $A_i$ or $\dot{A}_i$ or when operating in a steady state condition. The curve 18 indicates the same linear servo operating with a smaller input step function of error-rate showing that the general shape and character of the curve are unchanged for changes in magnitude of the input step function.

While the system described here uses only error-rate damping, it should be kept in mind that the principles of this invention are equally applicable to any type of linear control having viscous or coulomb output damping, integral control, or any control function of either input position, output position, error or any integrals or derivatives thereof.

It can be seen from this diagram that it would be desirable to operate a servo mechanism in the linear mode for small errors or error-rates, but to be able to apply the maximum torque of the drive motor when the error or error-rate increases to some predetermined magnitude. Such a servo will apply the maximum torque for all error and error-rate functions larger than a predetermined magnitude to give the maximum possible accelerations, but for small functions of error and error-rate, the servo operates in the linear mode with substantial damping and integral control to accurately follow the input as desired.

To create a device with the optimum response, the controls should function to reduce the error $E$ and error-rate $\dot{E}$ to zero concurrently. The obvious fault of the contactor type of device is that it reduces only one of these factors to zero in any given quadrant of its phase-plane portrait. In accordance with this invention, instead of causing torque reversal at point 13 on the ordinate, the computing mechanism effects a torque reversal at point 21 which is found by constructing parabola 22 of the same shape as curve 14 but with its center at the origin. Thus by effecting torque reversal at point 21, the phase-plane portrait of a servo built in accordance with this invention will follow curve 22 to the origin in the minimum possible time for a device having torque limitations. As curve 22 approaches the origin, operation reverts to the linear mode by any convenient switching means. If such a servo is additionally limited by velocity saturation, that is, if the input velocity $\dot{A}_i$ approaches the maximum speed of the motive means, i. e., approximately 1750 R. P. M. for a 4 pole, 60 cycle induction motor, then negative error-rates can only be utilized up to the point where $\dot{A}_i+\dot{E}=$ the maximum speed of the motor. This is illustrated in the phase-plane portrait as line 26 which is a constant velocity mode line, and the line along which such a servo will operate when at velocity saturation. The teaching of this invention is equally applicable to a device operating in the velocity saturation mode. Thus, in Fig. 1, in accordance with this invention, the servo follows curve 17 from the input step function on the ordinate to the point 19 as a linear servo mechanism and then follows the curve 12 as a contactor type of servo, with maximum torque, to point 21 where the torque is reversed and the device follows torque reversal curve 22 to to the area of the origin where it once again switches to the linear mode. Thus the advantages of linear operation for small errors and contactor operation for large errors are combined to achieve the optimum in servo performance.

Figure 2:
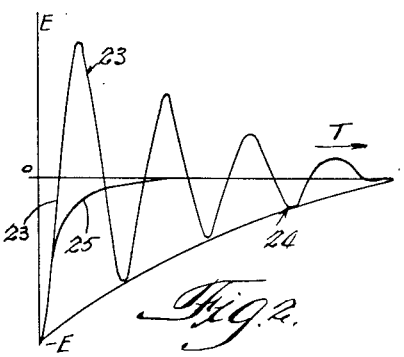
Fig. 2 is a response time plot of various modes of operation for a step-input error.

In Fig. 2, curve 23 illustrates diagrammatically the time response of a servo having very little damping and this would be substantially the curve of a contactor type of control. It can be seen, as time increases to the right, in Fig. 2, the error of such a device is rapidly reduced to zero, but thence continues to oscillate about the axis. The curve 24 is for a critically damped linear control, and this curve approaches zero error very slowly but doesn't oscillate or hunt as does the underdamped device. A device constructed in accordance with this invention will operate along curve 25 which is substantially coincident with curve 23 until the error is reduced to a predetermined value, at which time the torque is reversed to prevent the overrun characteristic of contactor operation. As the system approaches zero error, it reverts to linear mode operation to follow a curve similar to the latter portion of curve 24.

Figure 3:
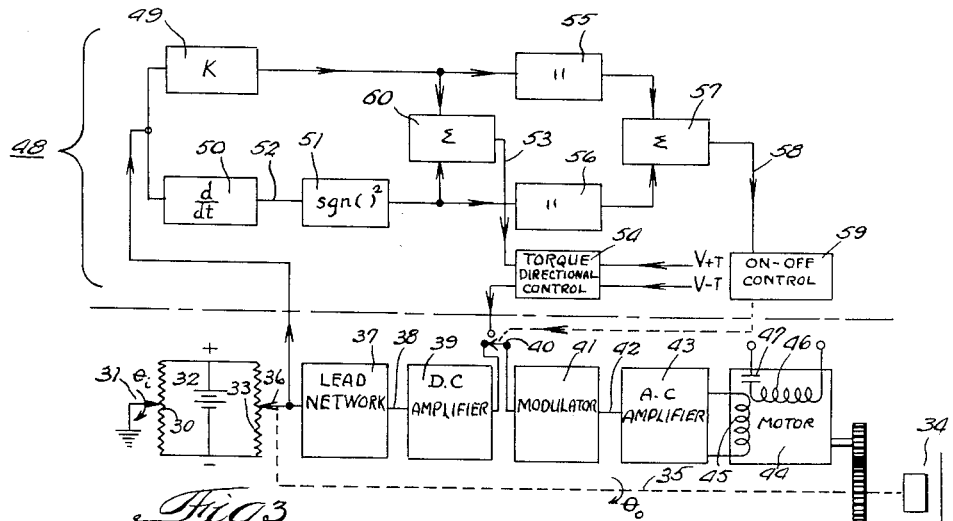
Fig. 3 is a block diagram of such a servo.

A device for accomplishing this is illustrated in the block diagram of Fig. 3. Rotating input shaft 31 is a driving means for the continuously rotatable wiper of potentiometer 30. A source of potential 32 is connected across this potentiometer and in parallel with a second potentiometer 33 which is driven by the output shaft 35 driving the servo load 34. Thus when the output shaft 35 is in positional agreement with the input shaft 31, the voltage present on wiper 36 will be zero with respect to ground. However, if the output shaft has a position different from that of the input shaft, a voltage will be present at wiper 36 which will be positive or negative, depending upon the relative position of the two shafts. This output voltage will be fed into a lead network 37 which is capable of generating a voltage proportional to positional difference or error and the rate-of-change of said error. Such lead networks are well known in the servo art. The output of lead network 37 is then fed through conductor 38 to a D. C. amplifier 39 and through a normally closed switch 40 to a modulator 41. The modulator may be of any well-known type whereby a D. C. signal is applied to the grid of an electron tube to modulate an A. C. signal present upon the plate of said tube. This modulated A. C. signal is then fed through conductor 42 to an A. C. amplifier 43 and thence to an A. C. motor 44 which may be of any conventional type, but is here shown as a two-phase induction motor having controlled winding 45 and winding 46 in series with phase shifting condenser 47. Coil 45 is energized by the controlled output of amplifier 43. The output of this motor then drives the load 34 and keeps load 34 in positional agreement with input 31 by the amplified signal from the potentiometer. This is a most satisfactory mode of operation of a servo for any small variations of error or error-rate. However, it is desirable when a function of the error or error-rate reaches a predetermined magnitude to apply the maximum signal to the modulator 41 necessary to produce the maximum torque from the motor 44. The computer section 48 of this servo system is used to compute and generate a voltage which will be proportional to a function of the error and error-rate and will control the application of full torque to motor 44. The output of potentiometer 33 is fed to circuit 49 which applies a constant multiplier K to generate a new voltage equal to KE. In parallel with circuit 49 is a circuit 50 designed to take the derivative of the error to produce at its output a voltage proportional to the error-rate $\dot{E}$. This error-rate voltage is fed to the circuit 51 through conductor 52 which will produce a voltage proportional to the square of said error-rate $\dot{E}$ and at the same time retain the sign of the error-rate, i. e., $\dot{E}|\dot{E}|$. The output of circuit 51 and the output of circuit 49 are then applied to summation circuit 60 which will arithmetically combine the two voltages to produce a voltage proportional to the square of the error-rate and the error, i. e., $KE + \dot{E}|\dot{E}| = C_1$. The output of the summation circuit is connected by conductor 53 to an electronic switch 54. This electronic switch will normally have a voltage present upon it so that it will normally be in an actuated condition. However, when the voltage of the summation circuit $C_1$ goes to zero—in other words, when the value of $KE$ is equal to the value of $\dot{E}|\dot{E}|$ but of opposite sign—the electronic switch will be de-energized. This point is the desired point of torque reversal of the driving means, represented by all points on curve 22 in Fig. 1, and the electronic switch will affect this torque reversal by changing the D. C. output voltage from a positive to a negative character with a consequent phase inversion of the input to coil 45. Thus the computer portion synthesizes a voltage proportional to $\dot{E}|\dot{E}| + KE$ from the output of potentiometer 33 and this voltage will determine the line of torque reversal 22 which will coincide with the path of the phase-plane portrait to the origin at full negative torque. While this computer output is the function for minimum correcting time, other functions can be chosen for various control characteristics without departing from this invention.

Figure 4:
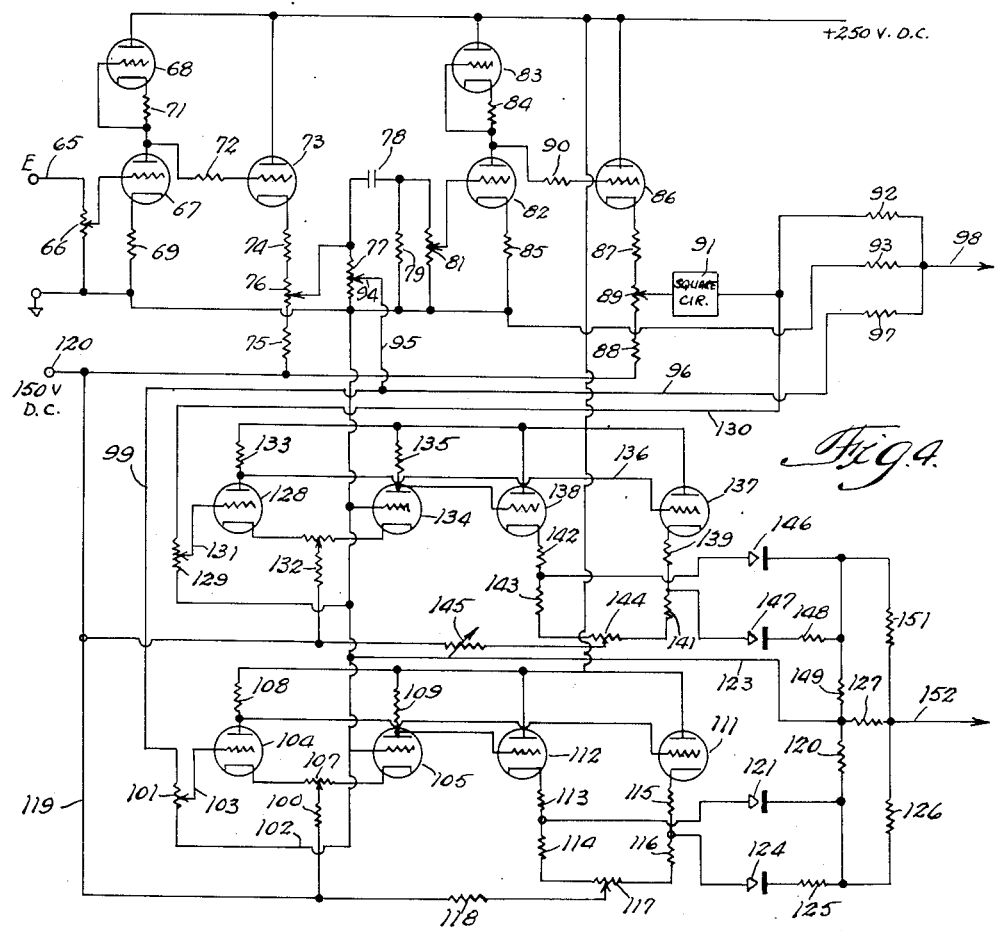
Fig. 4 is a schematic circuit diagram of the computer elements of the servo of Fig. 3.

The output of circuit 49 is also fed to a second circuit 55 which will act to convert the output of circuit 49 into a voltage of absolute magnitude $|KE|$. In other words, if the error voltage be positive or negative, the output of circuit 55 will always be of the same sign, i. e., negative. In a like manner, the output of circuit 51 is connected to a circuit 56 which will generate a voltage proportional to the absolute value of the output voltage of the circuit 51. The outputs of 55 and 56 are then combined in a summation circuit 57 which will produce a voltage equal to the sum of the absolute values of the outputs of circuits 49 and 51; $|\dot{E}^2| + |KE| = C_2$. The output of this summation circuit 57 is connected by conductor 58 to a second electronic switch 59 which will determine the control of switch 40. The position of switch 40 normally applies the linear control to modulator 41. When the sum of the absolute magnitudes, $C_2$, exceeds a predetermined magnitude represented by the curves 12, 14 and 16 in Fig. 1, the on-off control 59 will move switch 40 to the actuated position. At this time, the torque directional control 54 will apply a D. C. voltage to the modulator 41 of a magnitude which will produce maximum output torque and of a sign correct to produce the torque in the direction required to reduce the error to zero. The operation of computer circuit 48 can better be understood from Fig. 4 which is a schematic circuit diagram of the elements indicated by blocks 49, 50, 51, 55, 56, 57 and 60. In Fig. 4, the error voltage is applied between terminals 65 and ground. A portion of this voltage E is tapped off by potentiometer 66 and supplied to the grid of tube 67 which is one tube of a series D. C. amplifier, including tubes 67 and 68. The series D. C. amplifier uses two triodes in a common envelope, one as the amplifier, and the second as a constant load for the amplifier. Thus, for any changes in filament voltage or changes within the tube from aging, substantially no change will be evident in the output of the amplifier circuit. Resistor 69 is a cathode bias resistor for the amplifier, and resistor 71 is the cathode bias resistor for the load triode 68. The output of this amplifier is applied to a cathode follower circuit through resistor 72. The cathode follower consists of a triode 73, load resistors 74, 75, and potentiometer 76. A portion of the voltage present across the load resistors controlled by potentiometer 76 is present across potentiometer 77 and is there applied to a differentiating circuit. The differentiating circuit is represented by condenser 78 and resistor 79. The relative magnitudes of these elements 78 and 79 are so chosen as to produce a voltage at their output across potentiometer 81 which is substantially the time derivative of the voltage present across potentiometer 77. The wiper of potentiometer 81 then applies a voltage to the triode 82 which is again in a series D. C. amplifier circuit consisting of triodes 82 and 83 within the same envelope, cathode bias resistor 84 for the load tube 83, and cathode bias resistor 85 for the amplifying tube 82. The output of this D. C. amplifier is taken from the plate of tube 82 and applied to a cathode follower triode 86 through a grid resistor 90. The load of cathode follower 86 consists of resistors 87 and 88 and a potentiometer 89. The voltage present on the wiper of potentiometer 89 is proportional to $\dot{E}$, the error-rate. This signal is applied to a squaring circuit 91 which will be described hereinafter. This squaring circuit produces at its output a voltage equal to $\dot{E}|\dot{E}|$. The output of the squaring circuit 91 is then applied to resistors 92 and 93 which are arranged as a voltage divider.

Wiper 94 of potentiometer 77 is adjusted to tap off a portion of the voltage across potentiometer 77, proportional to KE, and apply it through conductors 95 and 96 and resistor 97 to resistor 93 which forms a common summing circuit for the output of the squaring circuit, which is proportional to $\dot{E}|\dot{E}|$, and the voltage from wiper 94, which is proportional to KE. This output is then applied through conductor 98 to the torque direction control 54 of Fig. 3, as described above.

The signal present at wiper 94 is also connected through conductor 95 and conductor 99 to potentiometer 101 and back to ground through conductor 102. The wiper 103 of potentiometer 101 is adjusted to apply a fixed proportion of the voltage to the grid of tube 104. Tubes 104 and 105 are connected with a common cathode resistor 106 through potentiometer 107 to form a differential amplifier circuit. This circuit functions broadly as follows: A signal is applied to the grid of tube 104 causing a change in current through the circuit including cathode resistor 106, a portion of potentiometer 107, tube 104, and its load resistor 108. This change in current in resistor 106 causes a change in the cathode bias which is normally present on tube 105. This causes a resulting change in conduction of the circuit including cathode resistor 106, tube 105, and its load resistor 109, and for increases in the current through tube 104 there will be a resulting decrease in the current through tube 105. Thus, the voltage applied to tube 111, which is the output of tube 104, will be 180° out of phase with the signal which is applied to the grid of tube 112, which is the output of tube 105. Tubes 111 and 112 are connected in cathode follower circuits. Tube 112 has cathode resistors 113 and 114, and tube 111, cathode resistors 115 and 116 associated therewith. Resistors 114 and 116 are connected across balancing potentiometer 117 and a common cathode resistor 118, which is connected through conductor 119 to terminal 120 which carries a negative voltage of the order of 150 volts. The output of the cathode follower tube 112 is applied through a rectifier 121 to resistors 122, 126 and 127 and thence by conductor 123 to ground. Rectifier 121 is so oriented in the circuit that it will conduct when the junction between resistors 113 and 114 is negative with respect to ground, thus producing a negative output voltage across resistor 127. This will be true when the signal present at potentiometer wiper 103, which represents KE, is also negative with respect to ground. The cathode follower of tube 111 is connected to a rectifier 124 through a resistor 125 and resistor 126 to common load resistor 127 for the outputs of tubes 111 and 112. Rectifier 124 is also oriented so that a negative voltage at the point between resistors 115 and 116 will cause current to flow through resistors 125, 126 and 127, and conductor 123 to ground. This will be true when the voltage on the grid of tube 111 is negative, which will be the case only when the signal present at wiper 103 is positive and, consequently, when KE is positive. Thus, whether the error voltage is positive or negative, a negative voltage of proportional magnitude will appear across resistor 127 which constitutes an output for this portion of the circuit. The output of the squaring circuit 91 is fed by conductor 130 to tube 128 through potentiometer 129 and its associated wiper 131. Tubes 128 and 134 serve as a differential D. C. amplifier, as described above for tubes 104 and 105, and have associated therewith common cathode resistor 132 and load resistors 133 and 135. Tube 134 serves as an inverter for the signal by connecting its grid to ground and providing a connection of its cathode with the common cathode resistor 132. The output of tube 128 is then fed through conductor 136 to a cathode follower circuit including tube 137. The output of tube 134 is fed to a cathode follower circuit including tube 138. Tube 137 has cathode resistors 139 and 141, and cathode follower 138 has associated therewith cathode resistors 142 and 143. These tubes then have a common balancing cathode potentiometer 144 and an adjustable common cathode resistor 145. The outputs of these cathode followers feed rectifiers 146 and 147 in a manner identical with that described above for rectifiers 121 and 124. These rectifiers are connected to resistors 148, 149 and 151, and feed a common output resistor 127. Thus, the voltage present across 127 is now proportional to $|KE|+|\dot{E}^2|$. This potential present across output resistor 127 is thence fed by conductor 152 to the on-off control designated 59 in Fig. 3, which may be any voltage responsive switch device. Thus, when the absolute magnitude of this voltage, which is proportional to a function of the absolute values of error and error-rate, reaches a predetermined magnitude, it actuates the on-off control 59 and applies full torque to the load 34. The switch device 59 employed herein is one having a large hysteresis. That is, the magnetic structure is such that the current necessary to maintain actuation is much less than that necessary to originally actuate the device. This provides a delay in the reversion of operation to the linear mode upon reaching the torque reversal curve and will allow the phase-plane portrait to approach the origin while still operating in the full torque mode.

Figure 5:
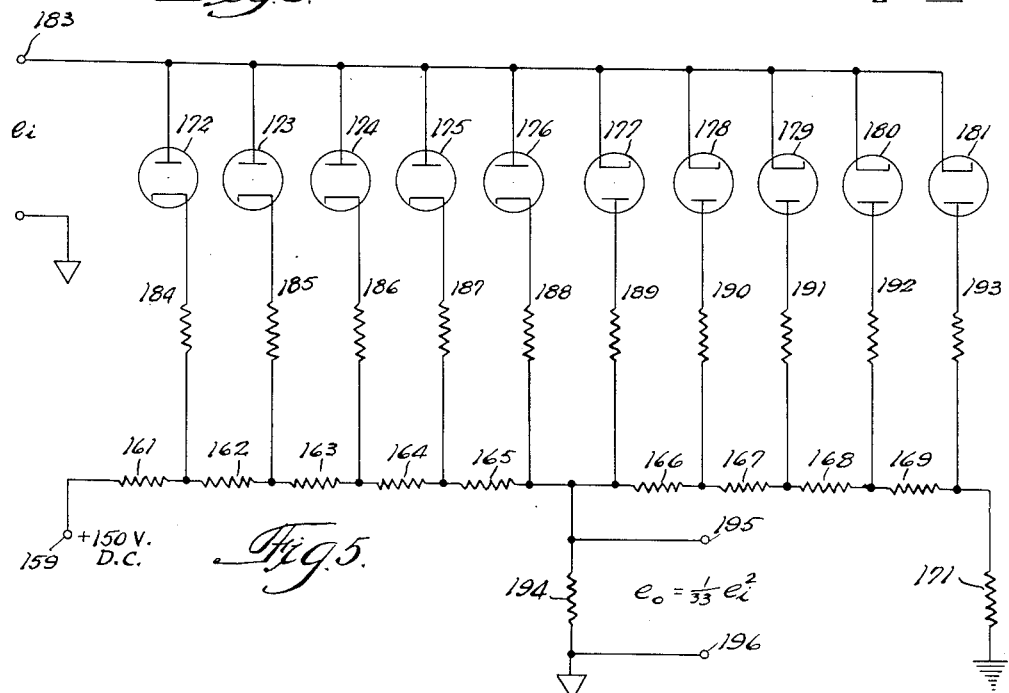
Fig. 5 is a schematic circuit diagram of the biased diode squaring circuit of Fig. 3.
Figure 6:
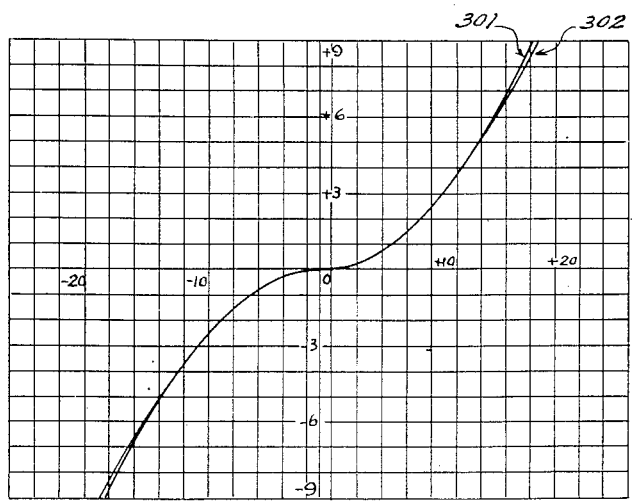
Fig. 6 is a curve representing the input-output characteristics of such a diode circuit.
Figure 8:
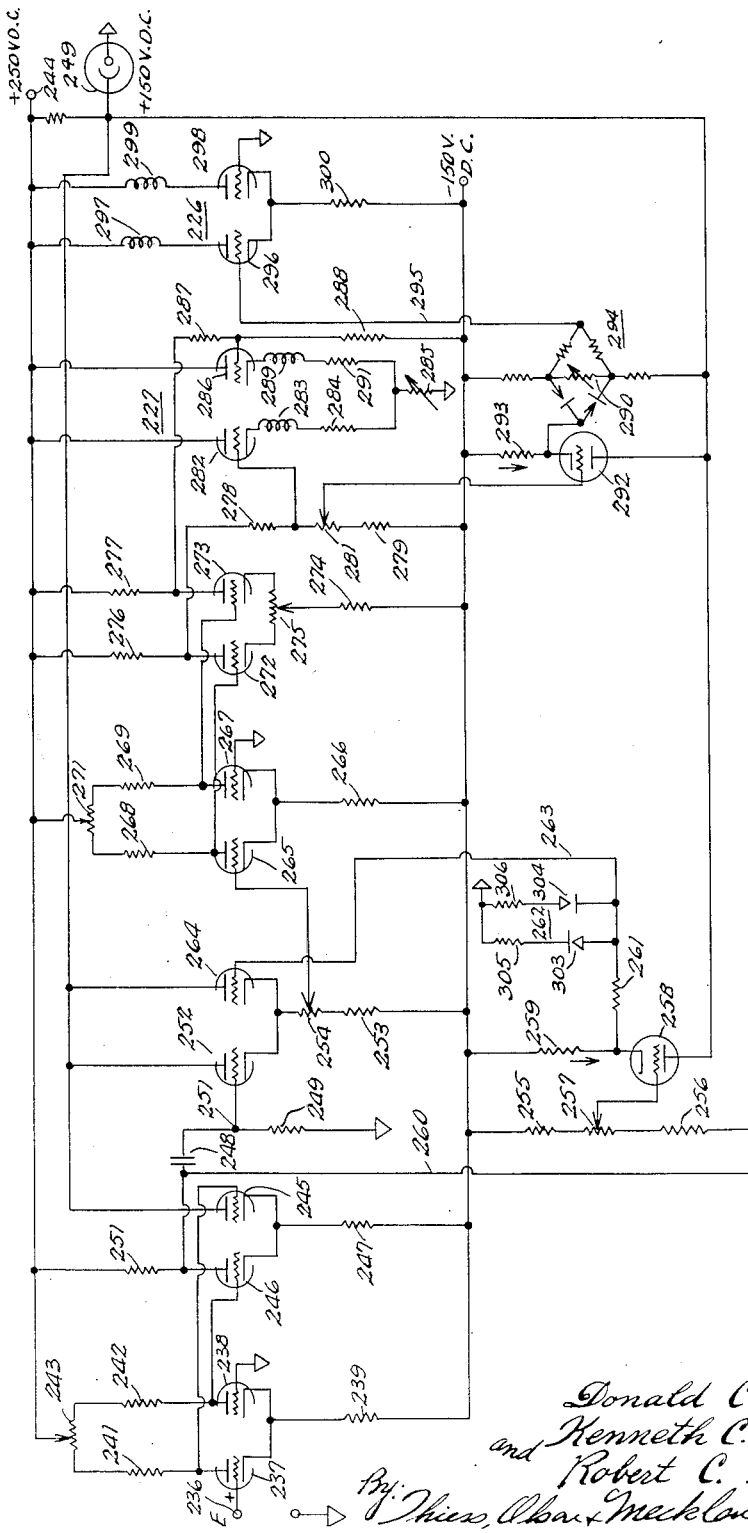
Fig. 8 is a schematic circuit diagram of the computer portions of the apparatus shown in Fig. 7.

Squaring circuit 91 is illustrated in Fig. 5 and its input-output characteristics are plotted on the curve of Fig. 6. The desired curve 301 is illustrated in Fig. 6, which would correspond to a true absolute parabola, $e_i{}^2 = 33e_0$, where $e_i$ is the input voltage and $e_0$ is the output voltage of squaring circuit 91. In comparison therewith is the output 302 of the circuit shown in Fig. 5 showing that in the range within which it is here utilized, the correlation of actual to theoretical values is very close.

The manner in which the squaring circuit operates is as follows: A voltage of 150 volts D. C. is applied to terminal 159 in Fig. 5 and thus current flows through resistors 161, 162, 163, 164, 165, 166, 167, 168, 169 and 171. Resistors 161 and 171 are relatively large compared to the remaining resistors in this series circuit. Thus, the voltage drop across each of the remaining resistors of the series circuit will be of the order of one or two volts. This will constitute a D. C. bias on each of the triodes 172 through 181. A series circuit exists between terminal 183, which is the circuit input, diodes 172 through 181 in parallel, their associated resistors 184 through 193, the biasing resistors 162 through 169, resistor 194, and ground. If a zero voltage is present between terminal 183 and ground, it can be seen that each of the diodes 172 through 181 will be biased by their associated resistors 162 through 169 in such a manner that no conduction will occur through any of the biased diodes. As the signal $e_1$ becomes positive, tube 176 will first begin to conduct through its associated resistor 188, and as the voltage $e_1$ continues to increase, successive tubes 175, 174, 173 and 172, which have their plates connected to terminal 183, will also begin to conduct. By the proper choice of resistors 184 through 188, the conduction through these parallel diodes can be controlled to closely approximate a parabolic relationship. If $e_1$ assumes negative values, the terminal 183 is negative with respect to ground, and tubes 177 through 181 will operate in a manner similar to that previously described for tubes 172 through 176. For a small negative value of voltage $e_1$, tube 177 will begin to conduct and will cause a voltage to exist across terminals 195 and 196, and as the negative value of voltage increases, successive tubes 178, 179, 180 and 181 will successively begin to conduct and will pass a current determined by the magnitudes of their associated resistors 190 to 193. Thus, again, by the proper choice of biasing resistors 166 through 169 and current limiting resistors 189 through 193, an input-output voltage relationship is established which very closely approximates a parabolic curve as illustrated in Fig. 6.

Figure 7:
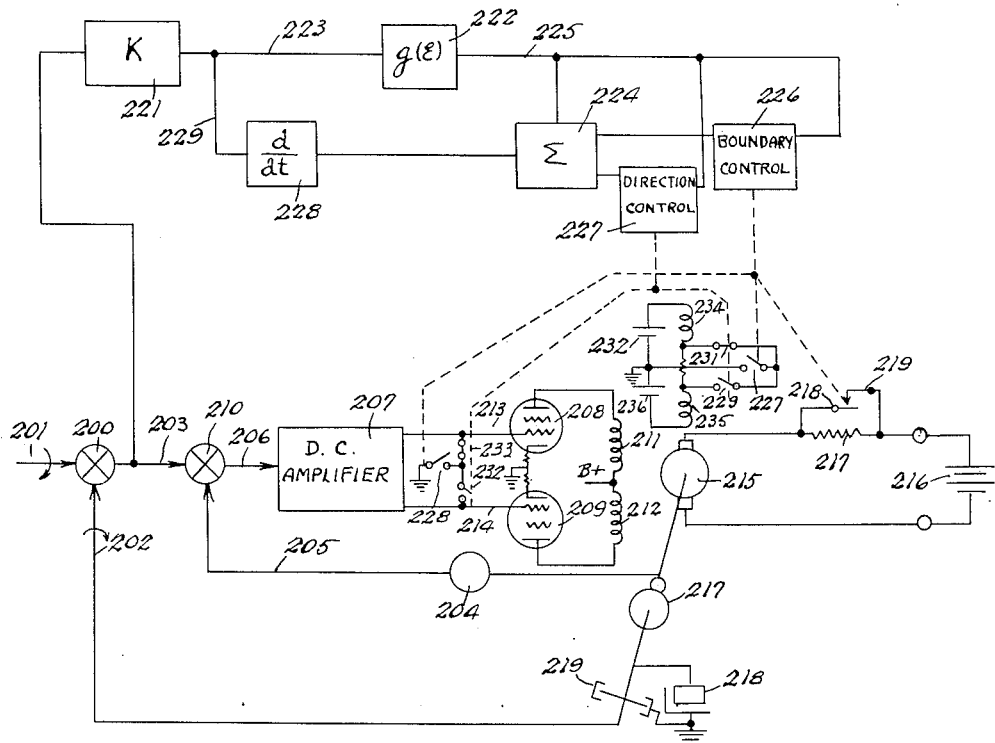
Fig. 7 is a block diagram of a second embodiment employing the teaching of this invention.

Fig. 7 illustrates a second embodiment in which the teaching of this invention is used to control the characteristics of a D. C. motor. A rotating shaft 201, which serves as a controlling element, is compared with a rotating shaft 202 which is driven by the output and is the element to be controlled. These are differentially connected to produce a voltage E proportional to their positional difference or error. This may be accomplished by using potentiometers similar to that shown in Fig. 3, or any other type of differential device. This error voltage is then fed to an electrical differential device 210 through conductor 203 and is combined with the output of a tachometer generator 204 to provide an additional voltage proportional to output velocity to provide output damping for the servo. The combined voltage, proportional to error and output velocity, is then fed to a D. C. amplifier 207, such as a differential amplifier, through conductor 206. The double-ended output of this D. C. amplifier is then placed upon the grids of two vacuum tubes 208 and 209 in order to control the current in field coils 211 and 212 which are a portion of the D. C. source of motive power. The output of the D. C. amplifier is placed on the control grids of tubes 208 and 209 in a manner to produce increases in flow of current through tube 208 and field winding 211 in direct proportion to the signal voltage generated by the differential 210. The current in tube 209 and its associated field winding 212 is inversely proportional to the signal voltage generated by differential 210. Thus, the windings 211 and 212 are differentially wound and when no signal is fed through conductor 206, the net field flux is substantially zero. Positive or negative signals at 206 will produce additional flux and the proper positive or negative directional torque compensation. The armature 215 of the driving means of this servo is energized by a voltage source 216. Voltage source 216 has in series with it a current limiting resistor 217 and a pair of shorting contacts 218, 219 in parallel therewith. During the linear operation of the servo mechanism, contacts 218 and 219 remain open so that resistor 217 is in a series circuit with the armature winding 215 and the voltage source 216. Thus, some torque less than the maximum available from the driving means will be applied during linear operation. Mechanical gearing means for the load are indicated as 217, the load schematically as 218, and output friction as 219.

The output of the differential 210 which is proportional to the error E is also fed to a computer which consists of a circuit 221 which applies a constant multiplier K, a circuit 222 to take a predetermined function of the error E, which will be substantially a second-degree function, and connecting means 223 between 221 and 222. The output of circuit 222 is fed to a summation circuit 224 through a conductor 225, and this summation circuit feeds a voltage to the boundary control 226 and direction control 227. The output of multiplier 221 is also applied to a differentiating circuit 228 through connector 229 to generate a voltage proportional to $\dot{E}$. This voltage is also injected in the summation circuit 224 and thence the combined voltage proportional to $K(\dot{E}+g(E))$ is fed to the boundary control 226 and direction control 227. Thus, when the voltage output of the summation circuit reaches a value which indicates that the function $K(\dot{E}+g(E))$ has reached a predetermined magnitude, the boundary control 226 is energized, closing contacts 227 and 228 and completing the circuit through contacts 218 and 219. At the same time, the direction control will have activated either switch 229 or 231, depending upon the direction of torque requirements of the device and in a like manner will energize either switch 232 or 233, depending upon the torque direction requirements. When this occurs, full voltage, and, consequently, full current is available for the armature winding 215 through contacts 218, 219 from the voltage source 216 as the resistor 217 has now been shorted out of this circuit. Additional auxiliary field winding 234 or auxiliary field winding 235 is energized by voltage source 236 or 237 to apply an additional torque to the load in the desired direction. The closing of switch 232 or 233 grounds the grid of either tube 208 or 209, and will thus cause the maximum current to flow in the tube having the grounded grid. Thus, when this device is operating as a contactor servo, the maximum torque available is increased in three distinct measures; first by the application of maximum field voltage through the normal field coils 211 and 212; second, by the application of a substantially increased armature current by the removal of resistor 217 from the armature circuit; and third, by the use of auxiliary field windings 234 or 235. Obviously, the choice of which field winding will be energized at a given instant will be determined by the direction in which it is desired to apply the torque.

Fig. 7 is a schematic representation of the computer circuit of Fig. 6 diagrammatically illustrated by blocks 221, 222, 224 and 226. This circuit operates as follows: An error voltage E is applied at terminal 236 which will alter the current in triode 237 which, with tube 238, forms a differential amplifier. Tubes 237 and 238 have a common cathode resistor 239 and respective load resistors 241 and 242. The load resistors are then connected to potentiometer 243, which is connected to a source of D. C. voltage 244. Potentiometer 243 is used to adjust the load resistance of tubes 237 and 238 in order to balance out any steady-state differences between tubes which might be present. The grid of tube 238 is grounded and thus the current in tube 238 is modulated by the cathode bias across resistor 239. Thus, if a positive voltage is applied to terminal 236, it will cause the cathodes of tubes 237 and 238 to become more positive, producing a negative relative voltage on the grid of tube 238. The output of tube 237 is connected to a second triode 245 and the output of tube 238 is connected to the grid of tube 246. The purpose of this circuit arrangement is to cancel any transient changes in voltage or tube characteristics which are usually detrimental in the operation of D. C. amplifiers. Tubes 245 and 246 have a common cathode resistor 247 and tube 245 has its plate directly connected to a regulated 150-volt D. C. supply 249. Tube 246 has a load resistor 251 and is connected to the 250-volt D. C. supply 244. Thus, when a signal is applied to terminal 236, these two stages of D. C. amplification act in the usual manner, but in the event of a change in supply voltage from the source 244, while conduction would increase in both tubes 237 and 238 causing an increase in output from both of these tubes, the effect on the output of tube 246 would be effectively cancelled by the effect of the change in current of tube 245 upon the bias voltage across resistor 247. The output of tube 246 is proportional to KE, the error voltage times an arbitrary constant, and is now fed through a differentiating circuit consisting of condenser 248 and resistor 249. The relative magnitudes of these two circuit elements are so chosen that the voltage present at point 251 will be proportional to the first derivative $K\dot{E}$ of the voltage KE. This voltage is now applied to the grid of tube 252 which is connected as a cathode follower having cathode resistor 253 and cathode potentiometer 254. The output of tube 246 is also fed through conductor 260, resistors 255 and 256, and potentiometer 257 to triode 258. Tube 258 has a cathode resistor 259 and its plate is directly connected to the 150-volt regulated supply 249 only partially shown here as a regulator tube. The output of tube 258 is taken at its cathode and fed through resistor 261 and network 262 so that the voltage present in conductor 263 will be proportional to the function $g(E)$ and will be fed to the grid of tube 264. Network 262 includes semiconductor type rectifier 303 oriented to conduct when the cathode of tube 258 is negative and semi-conductor rectifier 304 oriented to conduct when said cathode is positive and associated series resistors 305 and 306 connected to ground. Rectifiers 303 and 304 are chosen for their conduction characteristics in the small current range, which is substantially a square law relationship. This is to give a computer curve similar to curve 12, 14 and 16 of Fig. 1. Tube 264 has cathode resistor 253 and potentiometer 254 common with triode 252, and in this manner a summation is taken of KE and $g(E)$ to produce a voltage proportional to $K(\dot{E}+g(E))$. This voltage is now applied to the grid of triode 265. Triode 265 has cathode resistor 266 common with a second triode 267. In this manner, for any signal impressed upon the grid of 265 a signal of opposite relative polarity is applied to the grid of tube 267 which is grounded. Tubes 265 and 267 have load resistors 268 and 269 and balancing potentiometer 271 connected therewith, and the wiper of potentiometer 271 is connected to the 250-volt D. C. supply 244. Tubes 265 and 267 operate as a signal inverter as has been described previously. Thus, for a given input to the grid of tube 265, a signal of given polarity is applied to the grid of tube 272 from the output of tube 265 and a signal of opposite polarity is applied to the grid of tube 273, representing the output of tube 267. These tubes 272 and 273 have common cathode resistor 274 and a cathode balancing potentiometer 275. Tube 272 has a load resistor 276 connected to its plate and load resistor 276 is then connected to the 250-volt supply 244. In a like manner, the plate of tube 273 is connected to load resistor 277 which is then connected to supply 244. The output of tube 272 is applied to a voltage divider consisting of resistors 278 and 279 and potentiometer 281 and to the grid of a relay control tube 282. Tube 282 has its plate directly connected to the voltage source 244, but has in its cathode circuit resistor 284 and an adjustable resistor 285 to limit the current in relay coil 283. In a like manner, tube 286 has impressed upon its grid a signal from tube 273 which will always be of opposite polarity to the signal of tube 272. The signal of tube 273 is applied to the grid of tube 286 through a voltage divider consisting of resistors 287 and 288 so that in a zero signal condition, relay coils 289 and 283 will have the same current flowing therein, and as these coils are differentially associated there would be no resultant force therefrom. However, for all values of $K(\dot{E}+g(E))$ other than zero, the differential relay will be actuated. Relay coils 283 and 289 control switch contacts 233 and 231 of Fig. 7 when the current in 283 is the larger and actuates switches 232 and 229 when the current in coil 289 is the larger. Thus, it is seen that tubes 282 and 286 and their associated circuit elements comprise a direction control for a second mode of operation of this servo mechanism. The output of tube 272 is also applied through potentiometer 281 to the grid of tube 292. This tube is also connected as a cathode follower having cathode resistor 293, and the output is taken across resistor 293 and applied to the grid network circuit 294. The grid network 294 acts as a comparator so that no output will exist until the input is of a predetermined magnitude. The magnitude of the variable resistor 296 determines the magnitude of current which must flow in tube 292 before a voltage will appear on the grid of tube 296. The output of this grid circuit is then supplied through conductor 295 to tube 296 which controls relay coil 297, which is connected in its plate circuit. Tube 296 has cathode resistor 300 associated therewith, and tube 298 has a common cathode connection with tube 296 and a common cathode resistor 300. The grid of tube 298 is grounded. Thus, when the grid of tube 296 becomes positive, the cathode effectively becomes more positive, which causes a relative negative voltage to appear upon the grid of tube 298. Thus, if the grid of tube 296 assumes a relatively positive voltage with respect to its cathode, sufficient current will flow in relay coil 297 to actuate the contacts 227, 229 and close contacts 218 and 219. Likewise, if the grid of tube 296 becomes sufficiently negative, tube 298 will conduct and also complete the circuits controlled by switches 227, 228 and contacts 218 and 219. However, there will be a range of values of voltage proportional to $K(\dot{E}+g(E))$ which will not be sufficient to overcome the bias of network 294, and in this range the coils will be de-energized and the servo will operate in its linear mode. Relay coils 297 and 299 and their associated tubes and resistor constitute the boundary control 226 of Fig. 7 so that at any time that the magnitude of the voltages proportional to error and error rate become sufficiently large, one of these relays 297 or 298 will be energized and will close switches 227 and 228 and complete the circuit through contacts 218 and 219. Thus, at any time that the error and error rate reach predetermined magnitudes, the servo mechanism here described will operate in its second mode, or as an off-on device, and the magnitude of the voltages proportional to error and error rate, when considered with respect to their polarities, will determine the direction in which the torque of motor 215 will be applied. Again the coils 297 and 298 must have sufficient hysteresis to prevent the system from reverting to the linear mode for a predetermined time after the computer output falls below the value determined by network 294.

Thus, a system of position control is taught whereby a control element can be positioned in the minimum time for all errors of relatively large magnitude and can be positioned with extreme accuracy for steady-state conditions or when the error or error rate magnitudes are relatively small. It should be understood that any desired function of error can be synthesized in the computer portion of this invention and still remain within the scope thereof. The teaching herein can be applied to other closed-cycle control systems using various sources of motive power, error generating means and load without departing from the spirit and scope of this invention.

Thus a system and method of position control is taught which will provide optimum control for both near steady-state and transient conditions. This system overcomes the usual difficulties of maintaining near steady-state agreement normally encountered in the contactor type of servos, and also eliminates the usual problems encountered in linear type of servos which arise from poor response time and consequent poor tracking.

Without further elaboration, the foregoing will so fully explain the gist of our invention that others may, by applying current knowledge, readily adapt the same for use under varying conditions of service, without eliminating certain features, which may properly be said to constitute the essential items of novelty involved, which items are intended to be defined and secured to us by the following claims.

We claim:

1. In a position control system, a controlling element, a controlled element, means for producing an error voltage proportional to a positional difference between the controlling element and the controlled element, means for driving said controlled element, linear means for normally energizing said driving means as an integro-differential function of said error voltage, means for generating a voltage proportional to said error voltage, differentiating means for generating a voltage proportional to the rate of change of said error voltage, means responsive to said differentiating means for generating a voltage proportional to the square of said rate of change while retaining the sign of said rate of change, summation means to combine said voltage proportional to error voltage and said voltage proportional to the square of the error rate, means responsive to the output of said summation means to control said driving means and to apply the maximum force of said driving means in the direction necessary to reduce to zero said error voltage as indicated by the combined voltage, means for generating a voltage equal in magnitude to said voltage proportional to error voltage but of absolute sign, means for generating a voltage equal in magnitude to said square of error rate voltage but having absolute sign, summation means to combine said absolute values, and switch means responsive to said absolute summation to apply such maximum force of said driving means when said absolute summation reaches a predetermined value.

2. In a position control system, a controlling element, a controlled element, means for producing an error voltage proportional to a positional difference between the controlling element and the controlled element, means for driving said controlled element, linear means for normally energizing said driving means to produce a force proportional to an integro-differential function of said error voltage, multiplier means to produce a voltage proportional to said error voltage, differentiating means to produce a voltage equal to the rate-of-change of said error voltage, parabolizing means to generate from the output of said differentiating means a voltage equal to the square of said rate-of-change voltage retaining the sign of said rate-of-change voltage, summation means to combine the output voltages of said multiplier means and said parabolizing means, means for generating a voltage equal to the absolute values of the outputs of said multiplier means and parabolizing means, combining means to add said absolute values, circuit control means controlled by the output of said combining means to apply a voltage to said driving means to produce the maximum force of said driving means when the output of said combining means reaches a predetermined value and circuit control means actuated by the output of said summation means to determine the direction of said maximum force.

3. In a position control system having a controlling element, a controlled element, means for producing an error voltage proportional to the positional difference between the controlling element and the controlled element, and means for driving said controlled element, linear means for normally energizing said driving means to produce a force proportional to an integro-differential function of said error voltage, multiplier means to produce a voltage proportional to said error voltage, differentiating means to produce a voltage equal to the rate-of-change of said error voltage, parabolizing means to generate from the output of said differentiating means a voltage equal to the square of said rate-of-change voltage retaining the sign of said rate-of-change voltage, summation means to combine the output voltages of said multiplier means and said parabolizing means, means for generating voltages equal to the absolute values of the outputs of said multiplier means and parabolizing means, combining means to add said absolute values, circuit control means controlled by the output of said combining means to apply a voltage to said driving means to produce the maximum force of said driving means when the output of said combining means reaches a predetermined value, and circuit control means actuated by the output of said summation means to determine the direction of said maximum force.

4. In a position control system having a controlling element and a controlled element, electromagnetic means for driving said controlled element, error means for detecting a positional difference between the controlled element and the controlling element, control means for normally energizing said electromagnetic means as an integro-differential function of the output of said error means, computer means to generate a control voltage which is a function of the positional difference, rate-of-change of positional difference, and the acceleration characteristics of the system, and switch means responsive to a predetermined magnitude of said control voltage to cause said electromagnetic means to be energized to produce its maximum force.

5. In a position control system having a controlling element and a controlled element, direct current means for driving said controlled element, error means for detecting a positional difference between the controlled element and the controlling element, control means for normally energizing said direct current means as an integro-differential function of the output of said error means, computer means to generate a control voltage which is a function of the positional difference, rate-of-change of positional difference, and the acceleration characteristics of the system, and switch means responsive to a predetermined magnitude of said control voltage to cause said direct current means to be energized to produce its maximum design force.

6. In a position control system having a controlling element and a controlled element, direct current means for driving said controlled element, error means for detecting a positional difference between the controlled element and controlling element, linear control means for normally energizing the field of said direct current means as a linear integro-differential function of the output of said error means, computer means to generate a control voltage which is a function of the positional difference, the rate-of-change of positional difference and the acceleration characteristic of the system, and switch means responsive to a predetermined magnitude of said control voltage to substantially increase the field of said direct current means to produce the maximum design force of said means.

7. In a position control system, a rotatable controlling shaft, a rotatable controlled shaft, direct current means for driving said controlled shaft, error means for detecting a positional difference between said controlled shaft and controlling shaft, linear control means for normally energizing the field of said direct current means as an integro-differential function of the output of said error means, computer means to generate a control voltage which is a function of the positional difference, the rate-of-change of positional difference, and the acceleration characteristic of the system, and switch means responsive to a predetermined magnitude of said control voltage to substantially increase the field of said direct current means to produce the maximum design torque of said means.

8. In a position control system, a controlling element, a controlled element, direct current electric inductive means for driving said controlled element, error means for detecting a positional difference between said controlled element and controlling element, means for generating an error voltage proportional to said positional difference, control means for normally energizing the field of said direct current electric inductive means wherein said energization is proportional to an integro-differential function of said error voltage, means energized by said error voltage generating means for creating a control voltage proportional to a second integro-differential function of said error voltage, and switch means responsive to a predetermined magnitude of said second function of error voltage to substantially increase the field and armature current of said direct current electric inductive means to produce the maximum design torque of said means.

9. In a position control system having a controlling element and a controlled element, direct current means having a field and armature windings for driving said controlled element, error means for detecting a positional difference between the controlled element and the controlling element, control means for normally energizing the field of said direct current means as an integro-differential function of the output of said error means, resistance means serially connected with the armature winding of said direct current means, computer means to generate a control voltage which is a predetermined function of the positional difference, rate-of-change of positional difference, and acceleration characteristics of the system, and switch means responsive to a predetermined magnitude of said control voltage to increase the field of said direct current means to a predetermined maximum and remove said armature resistance from the series circuit.

10. In a position control system having a controlling element and a controlled element, direct current means having a plurality of field windings and an armature winding for driving said controlled element, error means for detecting a positional difference between the controlled element and the controlling element, control means for normally energizing one pair of the field windings of said direct current means as an integro-differential function of the output of said error means, resistance means in series circuit with the armature winding of said direct current means, computer means to generate a control voltage which is a predetermined function of the positional difference, rate-of-change of positional difference, and the acceleration characteristics of the system, switch means responsive to a predetermined magnitude of said control voltage to increase the field of said one pair of field windings to a predetermined maximum, energize a second pair of said field windings and remove said armature resistance from the series circuit, and switch means to reverse said field at a predetermined time determined by said computer means to bring said controlled and controlling elements into positional and velocity agreement coincidentally.

11. In a position control system having a controlling element and a controlled element, alternating current means for driving said controlled element, error means for detecting a positional difference between the controlled element and the controlling element, control means for normally energizing said alternating current means as an integro-differential function of the output of said error means, computer means to generate a control voltage which is a function of the positional difference, rate-of-change of positional difference, and the acceleration characteristics of the system, and switch means responsive to a predetermined magnitude of said control voltage to cause said alternating current means to be energized to produce its maximum design force.

12. In a position control system having a controlling element and a controlled element, alternating current means for driving said controlled element, error means for detecting a positional difference between the controlled element and controlling element, linear control means for normally energizing the field of said alternating current means as a linear integro-differential function of the output of said error means, computer means to generate a control voltage which is a function of the positional difference, the rate-of-change of positional difference and the acceleration characteristic of the system, and switch means responsive to a predetermined magnitude of said control voltage to substantially increase the field of said alternating current means to produce the maximum design force of said means.

13. In a position control system having a controlling element and a controlled element, alternating current means having a plurality of field windings for driving said controlled element, error means for detecting a positional difference between the controlled element and the controlling element, control means for normally energizing one of the field windings of said alternating current means as an integro-differential function of the output of said error means, computer means to generate a control voltage which is a predetermined function of the positional difference, rate-of-change of positional difference, and acceleration characteristics of the system, switch means responsive to a predetermined magnitude of said control voltage to apply a maximum voltage to said one of the field windings in excess of the maximum output of said control means, and switch means to reverse the phase of said maximum voltage as determined by said computer means to produce torque reversal to cause said positional difference and rate of change of positional difference to approach zero coincidentally.

14. In a position control system having a rotatable controlling shaft and a rotatable controlled shaft, electromagnetic means for driving said controlled shaft, error means for detecting a positional difference between the controlled shaft and controlling shaft, control means for normally energizing said electromagnetic means as a linear integro-differential function of the output of said error means, computer means to generate control voltages which are a predetermined function of the positional difference, rate-of-change of positional difference, and the acceleration characteristics of the system, the first of said functions being a boundary control function represented by the equation $$2\frac{T}{J}|E|+|\dot{E}^2|=C_1$$

and the second of said functions being a torque reversal function represented by the equation $$2\frac{T}{J}E+\dot{E}|\dot{E}|=C_2$$

boundary switch means to apply the full torque of said electromagnetic means to said controlled element to reduce the positional difference when $C_1$ reaches a predetermined magnitude, and torque reversal switch means to reverse said full torque when $C_2$ is substantially equal to zero to cause said system to approach positional and velocity agreement coincidentally.

DONALD C. McDONALD.
KENNETH C. MATHEWS.
ROBERT C. BOE.

References Cited in the file of this patent
UNITED STATES PATENTS

| Number | Name | Date |
|---|---|---|
| 2,382,380 | Isserstedt | Sept. 4, 1945 |
| 2,445,289 | Cherry | July 13, 1948 |
| 2,452,769 | Lang | Nov. 2, 1948 |
| 2,508,162 | Herzwald | May 16, 1950 |
| 2,588,742 | McCallum | Mar. 11, 1952 |
| 2,588,743 | McCallum | Mar. 11, 1952 |
| 2,623,943 | Adler | Dec. 30, 1952 |